United States Patent
Poo et al.

(10) Patent No.: US 8,412,865 B2
(45) Date of Patent: Apr. 2, 2013

(54) METHOD, APPARATUS AND SYSTEM FOR AUTHENTICATION OF EXTERNAL STORAGE DEVICES

(75) Inventors: Teng Pin Poo, Singapore (SG); Henry Tan, Singapore (SG)

(73) Assignee: Trek 2000 International Ltd., Singapore (SG)

( * ) Notice: Subject to any disclaimer, the term of this patent is extended or adjusted under 35 U.S.C. 154(b) by 411 days.

(21) Appl. No.: 12/444,569

(22) PCT Filed: Oct. 4, 2006

(86) PCT No.: PCT/SG2006/000296
§ 371 (c)(1),
(2), (4) Date: Apr. 6, 2009

(87) PCT Pub. No.: WO2008/041950
PCT Pub. Date: Apr. 10, 2008

(65) Prior Publication Data
US 2010/0017546 A1    Jan. 21, 2010

(51) Int. Cl.
*G06F 3/00* (2006.01)
(52) U.S. Cl. ........................................ 710/36
(58) Field of Classification Search .............. 710/36
See application file for complete search history.

(56) References Cited

U.S. PATENT DOCUMENTS

| 5,778,421 | A | 7/1998 | Nagano |
| 6,901,511 | B1 | 5/2005 | Otsuka |
| 2004/0005057 | A1* | 1/2004 | Jang et al. ............... 380/270 |
| 2004/0025031 | A1* | 2/2004 | Ooi et al. ............... 713/186 |
| 2004/0088546 | A1* | 5/2004 | Shah et al. ............. 713/168 |
| 2005/0044368 | A1 | 2/2005 | Ahn et al. |
| 2005/0102522 | A1 | 5/2005 | Kanda |
| 2005/0251589 | A1 | 11/2005 | Wang |
| 2006/0003739 | A1 | 1/2006 | Sasakura et al. |
| 2006/0130129 | A1* | 6/2006 | Dai et al. ................. 726/9 |
| 2006/0174349 | A1 | 8/2006 | Cronce et al. |
| 2008/0148057 | A1* | 6/2008 | Hauw ...................... 713/185 |

FOREIGN PATENT DOCUMENTS

| CN | 1459168 | 11/2003 |
| EP | 1 647 913 | 4/2006 |
| JP | 2000-187647 | 7/2000 |
| JP | 2001-168859 | 6/2001 |
| JP | 2001-195311 | 7/2001 |

(Continued)

OTHER PUBLICATIONS

Notification of the First Office Action, Chinese Application No: 200680056202.1, Oct. 28, 2010.

(Continued)

*Primary Examiner* — Henry Tsai
*Assistant Examiner* — Juanito Borromeo
(74) *Attorney, Agent, or Firm* — SNR Denton US LLP

(57) ABSTRACT

A method for authentication of an external storage device (16) operatively connected to a port of a host computer (10) where the host computer (10) conducts a handshake with the external storage device (16) seeking an authentication key from the external storage device. The host computer (10) electrically disconnects the external storage device (16) from the host computer (10) if the authentication key is incorrect or not provided within a predetermined period. The host computer (10) allows access to the host computer (10) by the external storage device (16) if the authentication key is correct and provided within the predetermined period. Corresponding apparatus and systems are also disclosed.

16 Claims, 3 Drawing Sheets

FOREIGN PATENT DOCUMENTS

| | | |
|---|---|---|
| JP | 2002-312326 | 10/2002 |
| JP | 2003-216585 | 7/2003 |
| JP | 2005-174359 | 6/2005 |
| JP | 2005-310041 | 11/2005 |
| JP | 2006-092081 | 4/2006 |
| JP | 2006-195728 | 7/2006 |
| JP | 2006-221566 | 8/2006 |
| JP | 2007-148497 | 6/2007 |
| KR | 10-2004-0114293 | 12/2005 |
| TW | 578417 | 3/2004 |
| TW | 1261175 | 9/2006 |
| TW | 1241105 | 8/2012 |
| WO | WO 03/079163 | 9/2003 |
| WO | 2004/086294 | 10/2004 |

OTHER PUBLICATIONS

Grounds for Rejection, Korean Patent Application No: 10-2009-7009240, Jan. 3, 2011.

Supplementary European Search Report, European Application No. 06 799 859.1; Filing Date, Oct. 4, 2006; mailing date, Feb. 17, 2011 (8 pp.).

Japanese Patent Office Action corresponding to Japanese Serial No. 2009-531359 dated Apr. 6, 2012.

Taiwanese Patent Office Action corresponding to Taiwanese Serial No. 096137224 dated May 15, 2012.

* cited by examiner

METHOD, APPARATUS AND SYSTEM FOR AUTHENTICATION OF EXTERNAL STORAGE DEVICES

CROSS-REFERENCE TO OTHER APPLICATIONS

This is a National Phase of International Application No. PCT/SG2006/000296 filed on Oct. 4, 2006.

FIELD OF THE INVENTION

This invention relates to a method, apparatus and system for authentication of external storage devices and relates particularly, though not exclusively, to such a method apparatus and system for preventing unauthorized use of external storage devices with a host computer.

BACKGROUND TO THE INVENTION

There is many external storage devices on the market. These include optical-based storage devices such as hard disk drives, and flash-based storage devices including USB flash drives. Various standard interfaces may be used to connect them to a host computer including, but not limited to, USB, Firewire, and PCMCIA. There are also proprietary interface such as, for example, the "Memory Stick" interface, SD card interface, and so forth.

As the download rate may be quite high, and the storage device form factor becomes quite small a significant security and confidentiality threat is raised for companies. The threats include the unauthorized copying of sensitive or confidential information, and the uploading of malicious or malignant applications including viruses, and so forth. For example, an employee of a company can easily carry a small USB flash drive that is hidden from view. It can be inserted into a USB port on any company computer to download and save a copy of sensitive or confidential data; and/or to upload a virus thereby bypassing all virus filters. There is no way the company can control the situation unless they block all external interfaces, physically close all external interfaces, or deny users the ability to download data from or upload data to the company computer system. By doing so significant limitations will be created for those who are authorized to perform such acts.

SUMMARY OF THE INVENTION

According to a preferred aspect there is provided a method for authentication of an external storage device operatively connected to a port of a host computer, the method comprising: the host computer conducting a handshake with the external storage device seeking an authentication key from the external storage device; electrically disconnecting the external storage device from the host computer if the authentication key is at least one selected from the group consisting of: incorrect, and not provided within a predetermined period; and allowing access to the host computer by the external storage device if the authentication key is correct and provided within the predetermined period.

According to a second preferred aspect there is provided an external storage device able to be operatively connected to a port of a host computer by use of a connector of the external storage device, the external storage device comprising an authentication module configured to communicate with an authentication application of the host computer; the authentication module being configured to comprise an authentication key for sending to the authentication application for authentication of the external storage device.

According to a third preferred aspect there is provided a system for authentication of an external storage device operatively connected to a port of a host computer by use of a connector of the external storage device, the external storage device comprising an authentication module to communicate with an authentication application of the host computer; the authentication module comprising an authentication key for sending to the authentication application for authentication of the external storage device.

For all aspects, correct authentication keys may be maintained in a lookup table. The lookup table may be maintained in one of: the host computer, and a server of a network to which the host computer is connected. The authentication key may be restricted by at least one of: a particular user, a particular host computer, a particular terminal of a network to which the host computer is connected. The particular user may be determined by user login code, the particular host computer may be determined by host computer identity, and the particular terminal of the network may be determined by network terminal identity. The user login code, the host computer identity, and the network terminal identity may be stored in the lookup table.

Access to the host computer may be restricted to certain applications or certain data of the host computer, the restrictions being maintained in the lookup table. Access to the network may be restricted to certain applications or certain data, the restrictions being maintained in the lookup table.

The authentication key may be allocated to an external storage device that does not have the authentication key by querying if the authentication key is required and, upon a positive response within the predetermined period, checking the external storage device and, if the external storage device is clear, allocating the authentication key to the external storage device. Checking of the external storage device may include at least one of: external storage device identity, user identity, host computer identity, network terminal identity, and scans for viruses or other malignant applications or data.

The authentication module may be downloaded to the external storage device before the authentication key is sent to the external storage device.

The external storage device may be electrically disconnected from the host computer if the response is negative or if the response is not provided within the predetermined period.

BRIEF DESCRIPTION OF THE DRAWINGS

In order than the invention may be fully understood and readily put into practical effect there shall now be described by way of non-limitative example only preferred embodiments of the present invention, the description being with reference to the accompanying illustrative drawings.

In the drawings.

DETAILED DESCRIPTION OF THE PREFERRED EMBODIMENTS

Figure 1:
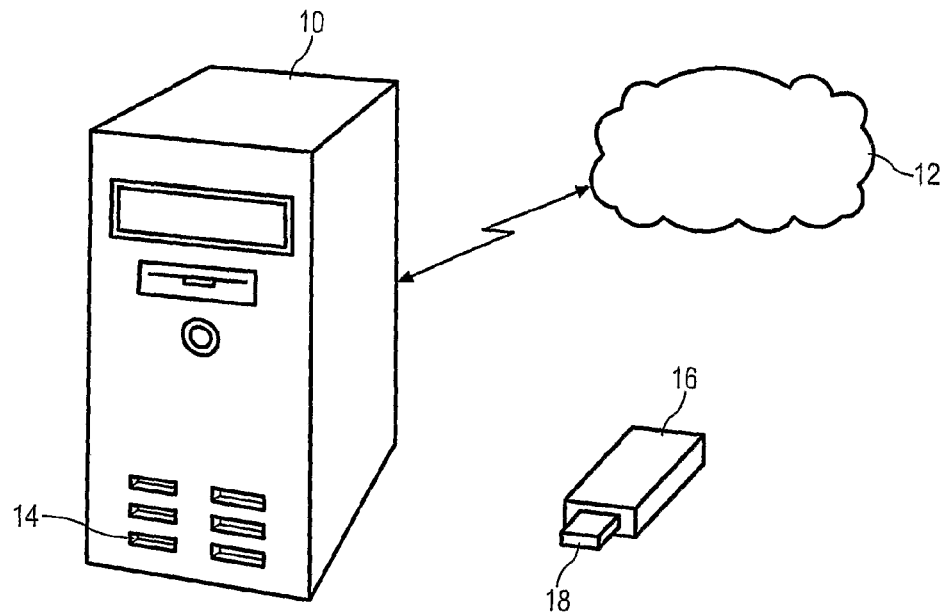
FIG. 1 is a perspective view of an embodiment of an external storage device about to be used with an embodiment of a host computer.

To first refer to FIG. 1 there is shown a computer 10 connected to a LAN 12. The computer 10 has a number of ports 14 for connection of an external storage device such as the USB flash memory storage device 16. By use of the external storage device 16 data may be downloaded from the computer 10 and/or the network 12, and/or data may be uploaded to the computer 10 and/or network 12. As shown, the external storage device 16 has a connector 18 which, in this case, is a USB connector. However, it may be any suitable connector able to operatively mate with one or more of the ports 14.

Figure 2:
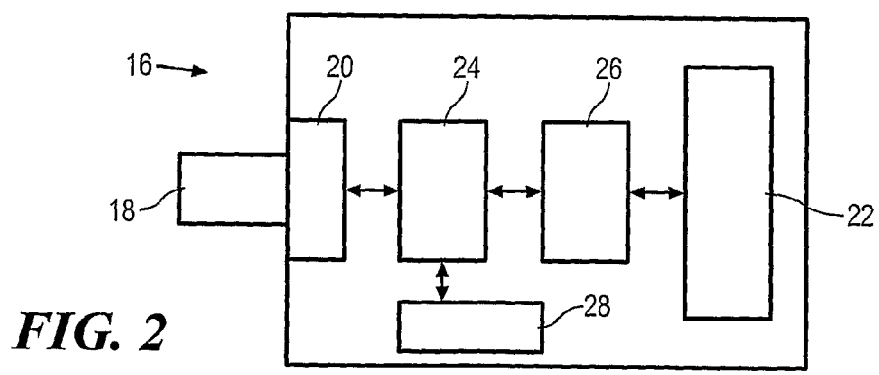
FIG. 2 is a block diagram of the external storage device of FIG. 1.
Figure 3:
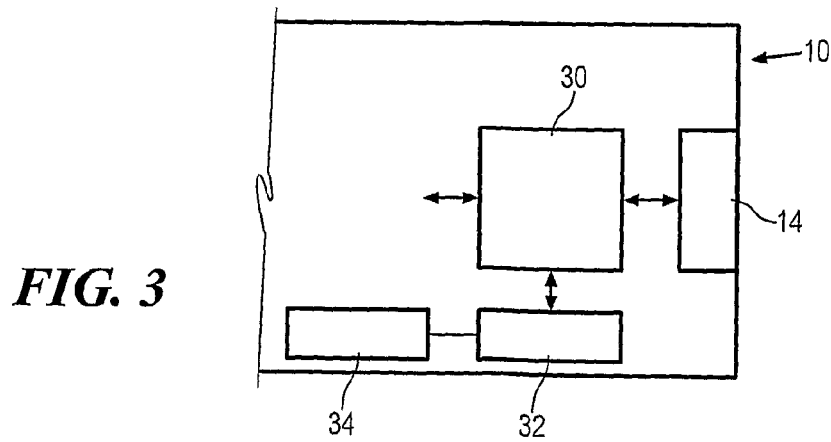
FIG. 3 is a partial block diagram of the host computer of FIG. 1.

In FIG. 2 the external storage device 16 is shown in more detail. The device 16 has a connector interface 20 as well as storage 22. The storage may be a hard disc, flash memory, or otherwise as required or desired. The storage 22 is controlled by a storage controller 26. A microprocessor 24 controls the overall operation of the device 24. An authentication module 28 is for authentication of the device 16. The authentication module 28 may be firmware, may be included in the microprocessor 24, or may be in a processor separate from the microprocessor 24.

The computer 10 includes a controller 30 that includes an authentication application 32 that is able to communicate with the authentication module 28 when connector 18 is operatively engaged in a port 14. The application 32 will block access to any of the systems of the computer 10 and/or network 12 by any external storage device 16 that is operatively connected to any one of the ports 14 and that is not authenticated; but will allow access any of the systems of the computer 10 and/or network 12 by any external storage device 16 that is operatively connected to any one of the ports 14 and that is authenticated. Authentication may be limited to particular individuals by login codes and/or particular computers by the computer identifier.

Figure 4:
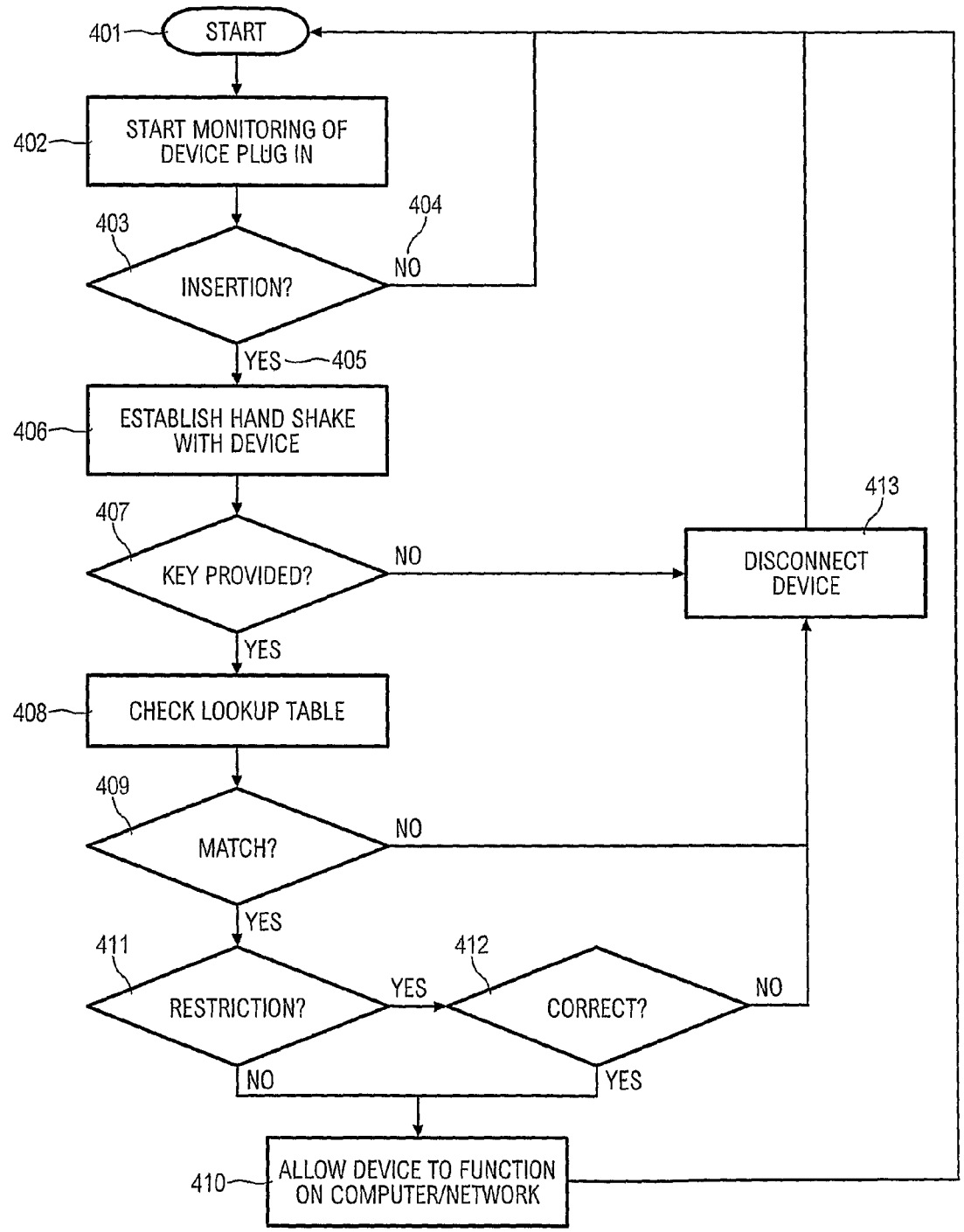
FIG. 4 is a flow chart of an embodiment.
Figure 5:
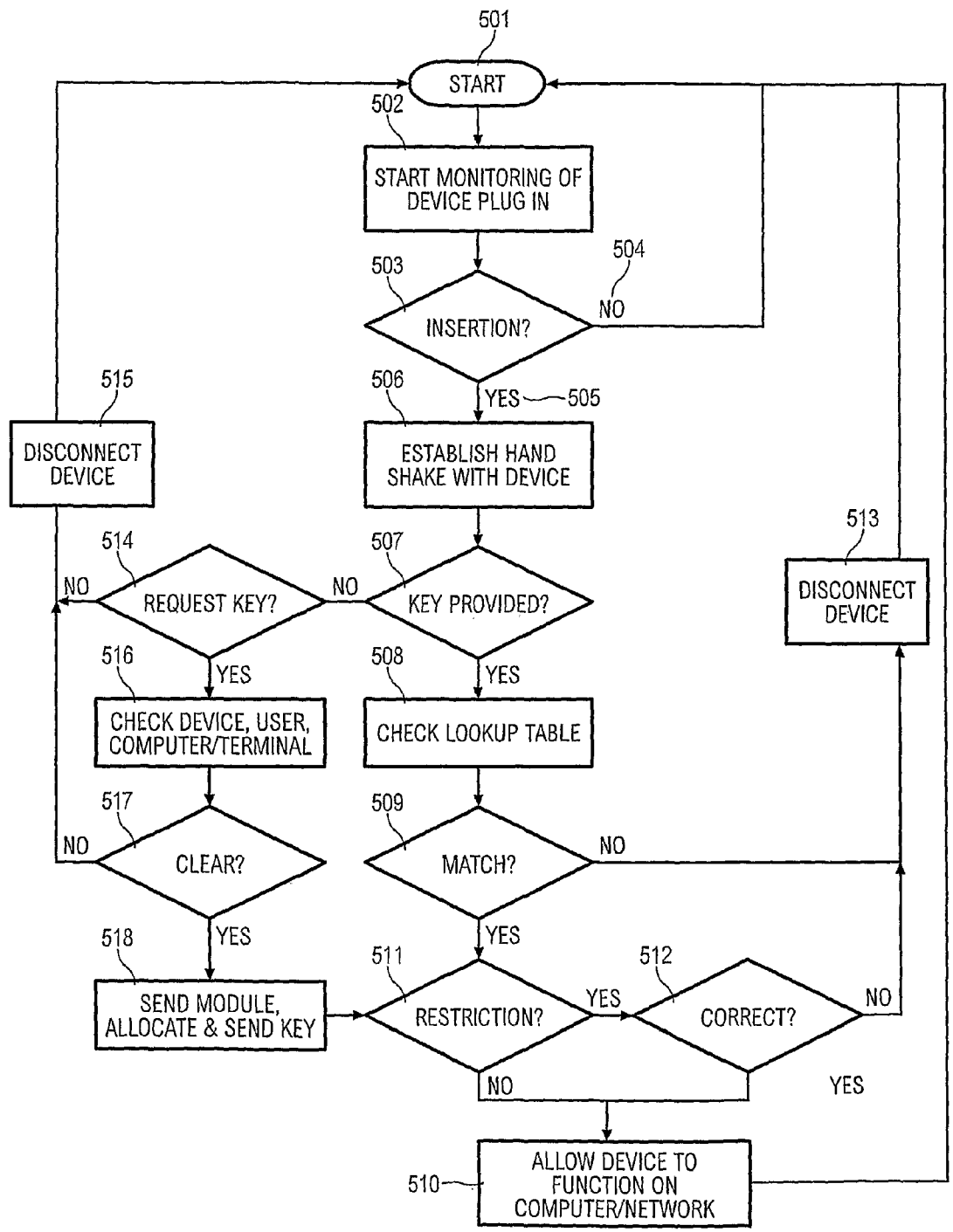
FIG. 5 is a flow chart of another embodiment.

Upon operative connection of the device 16 to the computer 10, authentication may be by a number of different methods. The device 16 may have previously been authenticated in which case the process of FIG. 4 is followed. An alternative is for the device 16 to be authenticated when it is operatively connected to the computer 10, the authentication being able to be relied upon for subsequent uses of the device 16. This is shown in FIG. 5.

Preferably, all initial authentications of devices 16, whether or not for particular users and/or computers is by an administrator that has the functionality and ability to allow the devices 16 to functionally interact with the computer 10 and/or network 12; and to authenticate devices 16 not issued by them but that are able to be authenticated. For the embodiment of FIG. 5, all subsequent authentications are by the process of FIG. 4. To refer to FIG. 4, the authentication application 32 automatically starts when the computer 10 is booted (401). It runs in the computer 10 isolated from user access except for the administrator mentioned above. In this way a user cannot tamper with, interfere with or otherwise hinder or prevent the operation of the application 32. This may be in the same manner as other "secured" applications that normally run on the computer 10. The application 32 includes a monitoring module 34 whereby it will monitor the ports 14 to detect when an external storage device 16 is connected to any one of the ports 14 (402). This may be done by, for example, regular polling of the ports 14 (403). If no insertion is detected (404), polling continues. When an insertion of a device 16 into a port 14 is detected (405) the application 32 will then try to establish an authentication handshake with the device 16 by performing a challenge and response (406). If the device 16 was inserted into the port 14 before the booting of the computer 10, the process will be the same, and access to the systems of the computer 10 and/or network 12 by the storage device 16 will be denied until authentication has taken place.

During the authentication process (406) the application 32 calls for the device 16 to provide an authentication code or key. If an authentication code or key is provided by the authentication module 28 (407), the application 32 checks a lookup table of current authentication codes or keys to determine if the authentication code or key is listed (408). If there is a match (409), the device 16 may be given access to the computer 10 and/or the network 12 (410). The lookup table may include restrictions (411). For example, the authentication key or code of the device 16 may be linked to a particular individual and/or computer 10. This can be checked by reference to the user login code, and the identity of the computer 10 and/or the terminal of the network 12 to which it is connected. Access may be limited to certain applications and/or data of the computer 10 and/or network 12. If there are restrictions, the application 32 checks the lookup table to ensure they are correct (412).

If the authentication module 28 is not able to respond correctly to the application 32 in the handshake procedure at (407), or if there is no match at (409), or if the restrictions are not correct at (412), the application 32 will immediately electrically disconnect, or isolate, the device 16 from the computer 10 to prevent the device 16 from having access to any of the systems of the computer 10 (413) and/or network 12. However, the device 16 may still remain inserted in the port 14.

In the embodiment of FIG. 5, there may be authentication of the device 16 during the authentication process. Here like reference numerals are used for like processes but the prefix number is changed from 4 to 5.

Again, the authentication application 32 automatically starts when the computer 10 is booted (501). It runs in the computer 10 isolated from user access except for the administrator mentioned above. In this way a user cannot tamper with, interfere with or otherwise hinder or prevent the operation of the application 32. This may be in the same manner as other "secured" applications that normally run on the computer 10. The application 32 again includes the monitoring module 34 whereby it will monitor the ports 14 to detect when an external storage device 16 is connected to any one of the ports 14 (502). This may be done by, for example, regular polling of the ports 14 (503). If no insertion is detected (504), polling continues. When an insertion of a device 16 into a port 14 is detected (505) the application 32 will then try to establish an authentication handshake with the device 16 by performing a challenge and response (506). If the device 16 was inserted into the port 14 before the booting of the computer 10, the process will be the same, and access to the systems of the computer 10 and/or network 12 by the storage device 16 will be denied until authentication has taken place.

During the authentication process (506) the application 32 calls for the device 16 to provide an authentication code or key. If an authentication code or key is provided by the authentication module 28 (507), the application 32 checks a lookup table of current authentication codes or keys to determine if the authentication code or key is listed (508). If there is a match (509), the device 16 may be given access to the computer 10 and/or the network 12 (510). The lookup table may include restrictions (511). For example, the authentication key or code of the device 16 may be linked to a particular individual and/or computer 10. This can be checked by reference to the user login code, and the identity of the computer 10 and/or the terminal of the network 12 to which it is connected. Access may be limited to certain applications and/or data of the computer 10 and/or network 12. If there are restrictions, the application 32 checks the lookup table to ensure they are correct (512).

If the authentication module 28 is not able to respond correctly to the application 32 in the handshake procedure at (507) due to the device 16 not having previously been authenticated, authentication may take place by a query from the application 32 to the device 16 (517). This will be displayed on a monitor and will require user input. If there is no response within a predetermined period such as, for example, thirty seconds, or if the response is in the negative, the application 32 will immediately electrically disconnect, or isolate, the device 16 from the computer 10 to prevent the device 16 from having access to any of the systems of the computer 10 (515) and/or network 12. However, the device 16 may still remain inserted in the port 14.

If at 515 the response is within the predetermined period and is positive, the application 32 checks the device 16. This may include one or more of: device identity, user identity, computer identity, and network terminal identity; and may include scans for viruses or other malignant applications or data. If all are in order, the administrator can allocate a key for the device 16 and record the key in the lookup table. Any restrictions on the user and/or computer/terminal may be created at this time and included in the lookup table. The necessary module 28 is then downloaded to the device 16, if not previously downloaded. The application then sends the key to the device 16 for storage in the authentication module 28 or memory 22. Access to the computer 10 and/or network 12 is then granted within the scope of the restrictions created.

If there is no match at (509), or if the restrictions are not correct at (512), the application 32 will immediately electrically disconnect, or isolate, the device 16 from the computer 10 to prevent the device 16 from having access to any of the systems of the computer 10 (513) and/or network 12. However, the device 16 may still remain inserted in the port 14.

The lookup table may be maintained in the host computer 10 and may be maintained by the administrator. If the computer 10 is connected to the network 12, the lookup table is preferably maintained in a server of the network 12 and again is maintained by the administrator. However, application 32 will reside in the computer 10 whether or not it is connected to the network 12.

Whilst there has been described in the foregoing description preferred embodiments of the present invention, it will be understood by those skilled in the technology concerned that many variations in details of design, construction and/or operation may be made without departing from the present invention.

What is claimed is:

1. A method to authenticate an external USB storage device connected to a port of a host computer on a network, the method comprising:

the host computer conducting an authentication handshake with the external USB storage device and during the authentication handshake the host computer seeks an authentication key from the external USB storage device, with correct authentication keys being maintained in a lookup table, the lookup table also including restrictions, the restrictions being for access to at least one of: applications, data, and network;

electrically disconnecting the external USB storage device from the host computer if the authentication key is incorrect;

allowing access to the host computer by the external USB storage device if the authentication key is correct and provided within a first predetermined period; and when the authentication key is not provided within the first predetermined period, allocating the authentication key to the external USB storage device that does not have the authentication key upon receiving a positive response within a second predetermined period to a query for whether the authentication key is required, checking the external USB storage device to determine whether the USB storage device stores data indicating that it is of a predetermined identity and, if the external USB storage device is of the predetermined identity, allocating the authentication key to the external USB storage device, wherein access to either the host computer or the network is restricted to certain applications or certain data of the host computer or the network for a correct authentication key, the restrictions being created in accordance with the predetermined identity when the correct authentication key is allocated.

2. A method as claimed in claim 1, wherein the correct authentication keys are maintained in the lookup table maintained in one of: the host computer, and a server of the network to which the host computer is connected.

3. A method as claimed in claim 1, wherein the authentication key is restricted by at least one selected from the group consisting of: a particular user, a particular host computer, a particular terminal of the network to which the host computer is connected.

4. A method as claimed in claim 3, wherein the particular user is determined by user login code, the particular host computer is determined by host computer identity, and the particular terminal of the network is determined by network terminal identity.

5. A method as claimed in claim 4, wherein the user login code, the host computer identity, and the network terminal identity are stored in the lookup table.

6. A method as claimed in claim 1, wherein the predetermined identity includes at least one selected from the group consisting of: external USB storage device identity, user identity, host computer identity, and network terminal identity.

7. A method as claimed in claim 1, wherein an authentication module is downloaded to the external USB storage device before the authentication key is sent to the external USB storage device.

8. A method as claimed in claim 1, wherein allocation of the authentication key is by an administrator.

9. A system to authenticate an external USB storage device connected to a port of a host computer on a network by use of a connector of the external USB storage device, the external USB storage device comprising an authentication module to communicate with an authentication application of the host computer; the authentication module comprising an authentication key for sending to the authentication application for authentication of the external USB storage device with correct authentication keys being maintained in a lookup table, the lookup table also including restrictions, the restrictions being for access to at least one of: applications, data, and network, wherein access to either the host computer or the network is restricted to certain applications or certain data of the host computer or the network for a correct authentication key, the restrictions being created in accordance with a predetermined identity when the correct authentication key is allocated to the external USB storage device within a first predetermined period, and when an authentication is not provided within the first predetermined period, allocating the authentication key to the external USB storage device that does not have the authentication key upon receiving a positive response within a second predetermined period to a query for whether the authentication key is required, checking the external USB storage device and, if the external USB storage device is of the predetermined identity, allocating the authentication key to the external USB storage device.

10. A system as claimed in claim 9, wherein the host computer conducts an authentication handshake with the external USB storage device seeking the authentication key from the external storage device.

11. A system as claimed in claim 9, wherein correct authentication keys are maintained in the lookup table maintained in one of: the host computer, and a server of the network to which the host computer is connected.

12. A system as claimed in claim 11, wherein the authentication key is restricted by at least one selected from the group consisting of: a particular user, a particular host computer, a particular terminal of the network to which the host computer is connected.

13. A system as claimed in claim 12, wherein the particular user is determined by user login code, the particular host computer is determined by host computer identity, and particular terminal of the network is determined by network terminal identity.

14. A system as claimed in claim 13, wherein the user login code, the host computer identity, and the network terminal identity are stored in the lookup table.

15. A system as claimed in claim 11, wherein the authentication key is allocated by an administrator.

16. A system as claimed in claim 9, wherein the predetermined identity includes at least one selected from the group consisting of: external USB storage device identity, user identity, host computer identity, and network terminal identity.

* * * * *